United States Patent
Kharbanda et al.

(10) Patent No.: US 12,238,170 B2
(45) Date of Patent: Feb. 25, 2025

(54) ON DEMAND SERVERLESS CONTAINER BASED STORAGE TRANSFER

(71) Applicant: Google LLC, Mountain View, CA (US)

(72) Inventors: Alankrit Kharbanda, Seattle, WA (US); Shyam Venkataraman, San Jose, CA (US); Sowmya Dayanand, Redmond, WA (US); Xiangqian Yu, Fremont, CA (US); Juan Esteller, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/360,884

(22) Filed: Jul. 28, 2023

(65) Prior Publication Data

US 2025/0039260 A1    Jan. 30, 2025

(51) Int. Cl.
*H04L 67/1097* (2022.01)
*H04L 9/40* (2022.01)
*H04L 67/06* (2022.01)

(52) U.S. Cl.
CPC ...... *H04L 67/1097* (2013.01); *H04L 63/0823* (2013.01); *H04L 67/06* (2013.01)

(58) Field of Classification Search
CPC ................ H04L 67/1097; H04L 63/0823
See application file for complete search history.

(56) References Cited

U.S. PATENT DOCUMENTS

| | | | | |
|---|---|---|---|---|
| 9,596,189 B1 * | 3/2017 | Lea | ...................... | G06F 9/45558 |
| RE48,714 E * | 8/2021 | Crouchman | .......... | G06F 9/5077 |
| 2010/0332820 A1 * | 12/2010 | Matsushima | ......... | H04L 9/3247 |
| | | | | 713/150 |
| 2015/0304417 A1 * | 10/2015 | Tan | ...................... | H04L 67/1095 |
| | | | | 707/610 |
| 2015/0334070 A1 | 11/2015 | Dinardo, Jr. et al. | | |
| 2022/0407907 A1 * | 12/2022 | Cheng | .................. | G06F 9/5077 |

FOREIGN PATENT DOCUMENTS

| CN | 115473891 A | 12/2022 |
|---|---|---|
| CN | 114844744 B | 7/2023 |

OTHER PUBLICATIONS

International Search Report and Written Opiniion issued in related PCT Application No. PCT/US2024/039929, dated Dec. 6, 2024.

* cited by examiner

*Primary Examiner* — Andrew C Georgandellis
(74) *Attorney, Agent, or Firm* — Honigman LLP; Brett A. Krueger; Grant Griffith

(57) ABSTRACT

A method for on demand serverless container based storage transfer includes receiving a request to transfer data from a first device to a second device, the first device hosted at a private cloud, the private cloud isolated from the Internet. The method includes determining that the first device is communicatively connected to the private cloud. The method also includes, in response to determining that the first device is communicatively connected to the private cloud, instantiating a container at the first device, the container configured to receive the data from the first device without directly accessing a local storage of the first device. The method includes transferring, using the container, the data from the first device to the second device.

16 Claims, 5 Drawing Sheets

ON DEMAND SERVERLESS CONTAINER BASED STORAGE TRANSFER

TECHNICAL FIELD

This disclosure relates to on demand serverless container based storage transfer.

BACKGROUND

Some organizations, such as military units and healthcare providers, must meet compliance and regulatory requirements with regard to data management. For these organizations, it is imperative to minimize exposure to attacks and data breaches. One solution for these organizations to meet compliance is by implementing a private cloud, also known as a distributed cloud host (DCH), which is a completely self-contained and air-gapped platform that does not require internet connectivity. The private cloud allows clients to manage data, services, infrastructure, APIs, and/or tooling without unnecessary exposure to external entities.

A private cloud typically includes one or more central data centers communicatively coupled to tactical edge devices (also known as appliances). For example, in a military environment, a data center may be deployed in a central location, such as a base, and the tactical edge devices may include drones, vehicles, portable stations, etc. The tactical edge devices can be disconnected and reconnected to the data center over time (e.g., a drone may be disconnected from the data center when it is deployed and reconnected upon its return).

SUMMARY

One aspect of the disclosure provides a computer-implemented method for on demand serverless container based storage transfer. The computer-implemented method is executed by data processing hardware that causes the data processing hardware to perform operations including receiving a request to transfer data from a first device to a second device. The first device is hosted at a private cloud and the private cloud is isolated from the Internet. The operations also include determining that the first device is communicatively connected to the private cloud. The operations include, in response to determining that the first device is communicatively connected to the private cloud, instantiating a container at the first device, the container configured to receive the data from the first device without directly accessing a local storage of the first device. The operations also include transferring, using the container, the data from the first device to the second device.

Implementations of the disclosure may include one or more of the following optional features. In some implementations, the second device is hosted at the private cloud. In these implementations, the second device may include a data center. In these implementations, the first device may include an edge device of the private cloud including one or more of a drone, a smart phone, a laptop, or an on-board computer of a vehicle.

In some implementations, the second device is not hosted at the private cloud. In these implementations, the operations may further include determining that the first device is communicatively coupled to the second device via a network and instantiating the container at the first device is in response to determining that the first device is communicatively coupled to the second device via a network. In these implementations, the network may include an Internet connection.

The container may be instantiated at the first device using a first certificate authority (CA) certificate. Further, the container may transfer the data to the second device using a second CA certificate. The first CA certificate and the second CA certificate may be different. In some implementations, the operations further include, prior to determining that the first device is communicatively connected to the private cloud, determining that the first device is not communicatively connected to the private cloud, wherein determining that the first device is communicatively connected to the private cloud includes determining that the first device has become communicatively connected to the private cloud after determining that the first device is not communicatively connected to the private cloud.

Another aspect of the disclosure provides a system for on demand serverless container based storage transfer. The system includes data processing hardware and memory hardware in communication with the data processing hardware. The memory hardware stores instructions that when executed on the data processing hardware cause the data processing hardware to perform operations. The operations include receiving a request to transfer data from a first device to a second device. The first device is hosted at a private cloud and the private cloud is isolated from the Internet. The operations also include determining that the first device is communicatively connected to the private cloud. The operations include in response to determining that the first device is communicatively connected to the private cloud, instantiating a container at the first device, the container configured to receive the data from the first device without directly accessing a local storage of the first device. The operations also include transferring, using the container, the data from the first device to the second device.

This aspect may include one or more of the following optional features. In some implementations, the second device is hosted at the private cloud. In these implementations, the second device may include a data center. In these implementations, the first device may include an edge device of the private cloud including one or more of a drone, a smart phone, a laptop, or an on-board computer of a vehicle.

In some implementations, the second device is not hosted at the private cloud. In these implementations, the operations may further include determining that the first device is communicatively coupled to the second device via a network and instantiating the container at the first device is in response to determining that the first device is communicatively coupled to the second device via a network. In these implementations, the network may include an Internet connection.

The container may be instantiated at the first device using a first certificate authority (CA) certificate. Further, the container may transfer the data to the second device using a second CA certificate. The first CA certificate and the second CA certificate may be different. In some implementations, the operations further include, prior to determining that the first device is communicatively connected to the private cloud, determining that the first device is not communicatively connected to the private cloud, wherein determining that the first device is communicatively connected to the private cloud includes determining that the first device has become communicatively connected to the private cloud after determining that the first device is not communicatively connected to the private cloud The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A private cloud is an isolated environment that includes cloud computing services and infrastructure that is hosted locally. In other words, a private cloud is self-contained and not accessible by devices outside of the private cloud (e.g., via the Internet), although some devices from the private cloud can be adapted to communicate to devices outside of the private cloud environment. Private clouds are especially useful for organizations that handle sensitive information, such as health care providers and military units. The private cloud may include a number of hardware devices that are communicatively coupled within the private cloud environment. Example hardware devices that can be deployed in a private cloud include data centers, which act as central data repositories and computational centers, and edge devices (also referred to interchangeably herein as "appliances"), which are typically smaller devices that can be connected/disconnected to the private cloud environment as necessary. For example, in a private cloud deployed within a military environment, an edge device can include drones and/or computing devices deployed on vehicles such as tanks.

Transferring data between devices in a private cloud environment is different from transferring data in a normal cloud environment. Normally, an Internet-based cloud implements a control plane to transfer data between devices. However, as a private cloud does not typically access the Internet, such a control plane is not available in the private cloud environment. Instead, private clouds typically execute data transfers between devices by cloning and/or executing a binary file transfer. However, this method of transferring data between devices can be slow and also can possibly expose local device storage between devices during transfer.

Implementations herein are directed to on demand serverless (i.e., in a private cloud) container-based storage transfer. In other words, the current disclosure provides for the use of containers to transfer data between various devices in a private cloud environment. Unlike previous methods of data transfer, the container-based approach maintains device security through the duration of the data transfer as the container does not directly access local storage of any device. Instead, the container is instantiated at a first device to receive data from the first device and then a second device retrieves the data from the container. The transfer of data using containers can be completed without exposing the local storage of either the first device or the second device throughout the data transfer process. Further, the container based data transfer process of the current disclosure is portable, reproducible, and scalable, allowing it to run on multiple devices and/or operating systems simultaneously.

Figure 1:
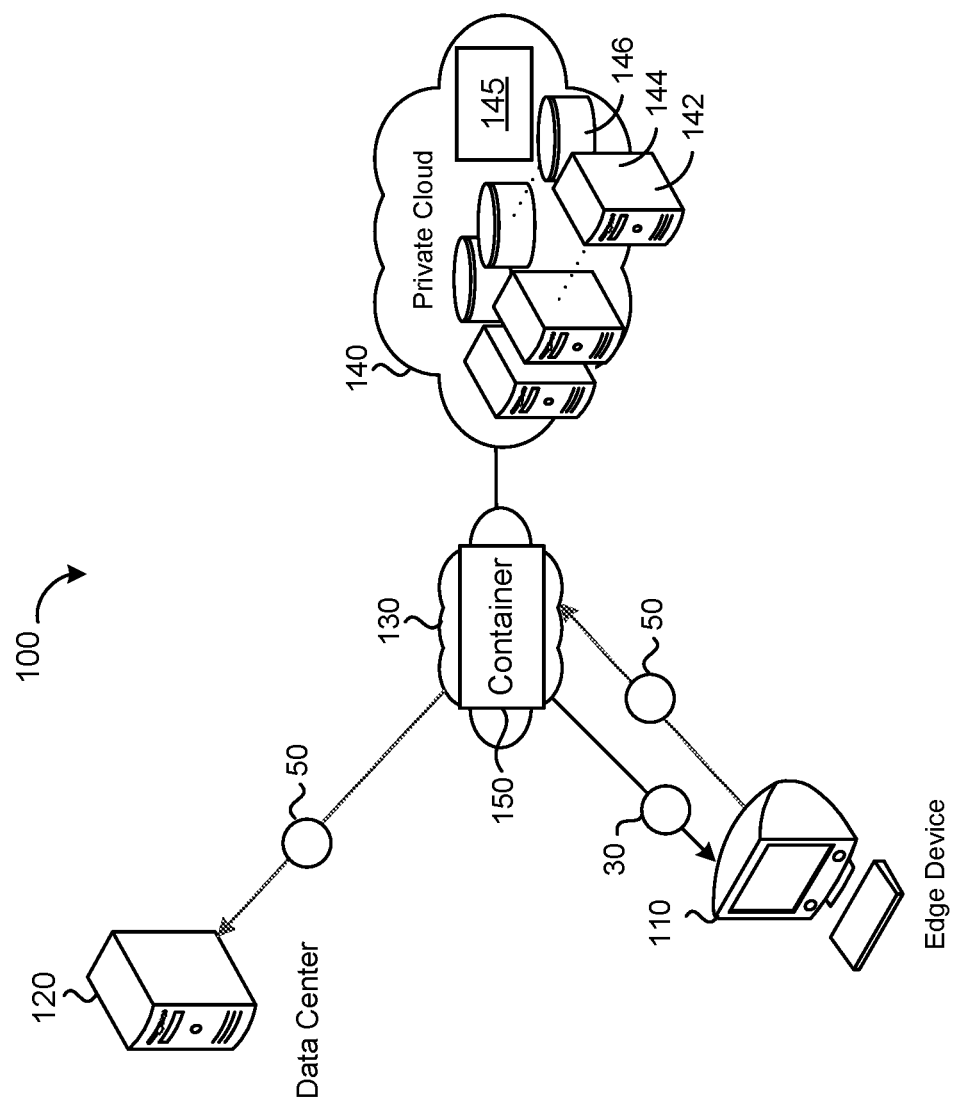
FIG. 1 is a schematic view of an example system for on demand serverless container based storage transfer.

Referring to FIG. 1, in some implementations, an on demand serverless container based storage transfer system 100 includes a private cloud 140 that is communicatively coupled to an edge device 110 and a data center 120 through a private network 130 (e.g., a local area network (LAN) and/or a wide area network (WAN)). The private cloud 140, including the connected devices 110, 120, may be isolated from devices outside of the private cloud 140 (i.e., the private cloud 140 is not connected to the Internet or any other network connections). Thus, the network 130 may be a secure private network that connects the various devices 110, 120 through wired and/or wireless connections. The private cloud 140 may be a distributed system having scalable/elastic resources 142. The resources 142 include computing resources 144 (e.g., data processing hardware) and/or storage resources 146 (e.g., memory hardware such as volatile and/or non-volatile addressable semiconductor memory). The edge device 110 and data center 120 may access and use the resources 142. In some implementations, the private cloud 140 executes a transfer module 145 that manages transfer of data 50 between various devices in the private cloud (i.e., the edge device 110 and the data center 120).

In some implementations, the private cloud 140 is an isolated environment that includes cloud computing services and infrastructure that is hosted locally. The private cloud 140 may be deployed by an organization that requires strict security of data 50, such as a military unit or hospital. The edge device 110 and the data center 120 can be any device suitable for the organization in which the private cloud 140 is deployed. In particular, the edge device 110 can refer to any device that is portable and/or can be connected/disconnected from the private cloud 140. For example, the edge device 110 can be any of a tablet, a smart phone, a smart watch, a drone, an on-board computer of a vehicle, or any other suitable portable computing device. Further, the data center 120 may be a stationary device that contains larger processing and storage capabilities, such as a single computer or a cluster of computers. The private cloud 140 can host any number of edge devices 110 and/or data centers 120, although only one of each is included in FIG. 1 for simplicity.

The private cloud 140 is configured for on demand serverless container based transfer of data 50 between devices 110, 120 of the private cloud 140. Generally, the private cloud 140, via the transfer module 145, is responsible for securely transferring data 50 between devices 110, 120. In particular, the transfer module 145 implements a container 150 during data transfer such that the transfer module 145 does not access local storage of any of the devices 110, 120 during the data 50 transfer processes. The container 150 is a package of software that includes all of the necessary elements to run in any environment (i.e., a private cloud 140) by virtualizing an operating system. In other words, the container 150 functions as a compute unit which may be instantiated at either one of the devices 110, 120, and/or the private cloud 140. The container 150 allows for easily sharing CPU, memory, storage, and network resources at the operating systems level and offers a logical packaging mechanism in which applications can be abstracted from the environment (i.e., the devices 110, 120) in which they actually run. By using a container 150 based process to transfer data 50, the transfer module 145 can initiate multiple transfers within the private cloud 140 simultaneously (i.e., instantiate containers 150 at various devices 110, 120). Further, the transfer module 145 is portable and scalable as the transfer module 145 can easily adjust containers 150 for the various devices 110, 120 of the private cloud 140 without requiring manual intervention (i.e., code rewrites) or processing power.

In an example container-based transfer of data 50, the transfer module 145 may receive a request 30 indicating that data 50 is to be transferred from the edge device 110 to the data center 120. The transfer module 145 may only accept the request 30 when it is provided by a user authorized to access the private cloud 140. For example, the transfer module 145 may include role based access controls (RBAC) to determine if the request 30 is from an authorized user. Further, the request 30 may be received at the transferring device (e.g., the edge device 110 in this example) or the receiving device (e.g., the data store 120 in this example). In some implementations, the transfer module 145 defines limitations such as a maximum memory, CPU, and/or network limit for the transfer of data 50. Accordingly, the request 30 must comply with the limitations defined by the transfer module 145, otherwise the transfer module 145 rejects the request 30.

In some implementations, each device 110, 120 of the private cloud 140 may correspond to a CA certificate such that the transfer module 145 establishes a secure connection with each device 110, 120 when communicating with the respective device 110, 120. In this example, the transfer module 145 may establish a secure connection with the edge device 110, based on the corresponding CA certificate, and then transmits the request 30 to the edge device 110 such that the edge device 110 can select the appropriate data 50 to upload to the container 150. If the edge device 110 is connected to the private cloud 140 (i.e., connected to network 130), the transfer module 145 instantiates the container 150 at the edge device 110. If the edge device 110 is not connected to the private cloud 140 (i.e., disconnected from the network 130), the transfer module 145 periodically (e.g., at regular or irregular intervals, such as once a minute, once an hour, once a day, etc.) rechecks to see if the edge device 110 is connected. The transfer module 145 may create a file (e.g., a YAML file) with specific details about the source and the destination (i.e., source type, destination type, source path, destination path, source and destination access credentials, source and destination custom CA certificates) Once the transfer module 145 instantiates the container 150 at the edge device 110, the edge device 110 uploads the data 50 to the container 150. In some implementations, the transfer module 145 schedules the transfer of data 50 based on demands of the system 100. For example, if the devices 110, 120 are in use or in a low power mode, the transfer module 145 may initiate (and/or schedule) the transfer of data 50 at a later time. The transfer module 145 may then deploy the container 150 at the data center 120 for the data center 120 to retrieve the data 50 from the container 150. In some implementations, the transfer module 145 first checks to ensure the data center 120 is connected to the private cloud 140 (i.e., connected to the network 130) before deploying the container 150 at the data center 120.

The transfer module 145 may also monitor the transfer of data 50 from the edge device 110 to the data center 120. For example, if the container 150 crashes (i.e., suffers from a software or hardware failure), the transfer module 145 may instantiate a new container 150. In some implementations, the transfer module 145 includes a limit of retry attempts (i.e., a maximum number of container 150 crashes). In some implementations, the transfer module 145 monitors a progress of the transfer of data from the source device (i.e., the edge device 110) to the container 150. In some of these implementations, if the source device disconnects from the network 130 midway through the transfer of data 50, the transfer module 145 restarts the upload once the source device is reconnected to the network 130 from the failure point without having to restart the entire upload of data 50. The transfer module 145 may track the progress of the transfer of data 50 by running a describe on the job or by analyzing pod logs.

While the example shown depicts the edge device 110 providing the data 50 and the data center 120 receiving the data 50, in practice either entity can provide the data 50 and/or receive data 50 via the transfer module 145. Further, the example system 100 of FIG. 1 is not intended to be limiting and may include multiple edge devices 110 and data centers 120. Thus, any number of additional devices 110, 120 hosted by the private cloud 140 can transfer and/or receive data 50 via the transfer module 145. In turn, the private cloud 140, via the transfer module 145, allows data 50 transfer between devices 110, 120 of the private cloud 140, without exposing the devices 110, 120 to external entities. Further, because the transfer module 145 implements containers 150 during the transfer of data 50, the transfer module 145 does not need to access local storage of any of the devices 110, 120 during the transfer of data 50. All communications between the transfer module 145, the container 150, and the various devices 110, 120 may be secured using CA certificates as an added extra layer of security.

Figure 2:
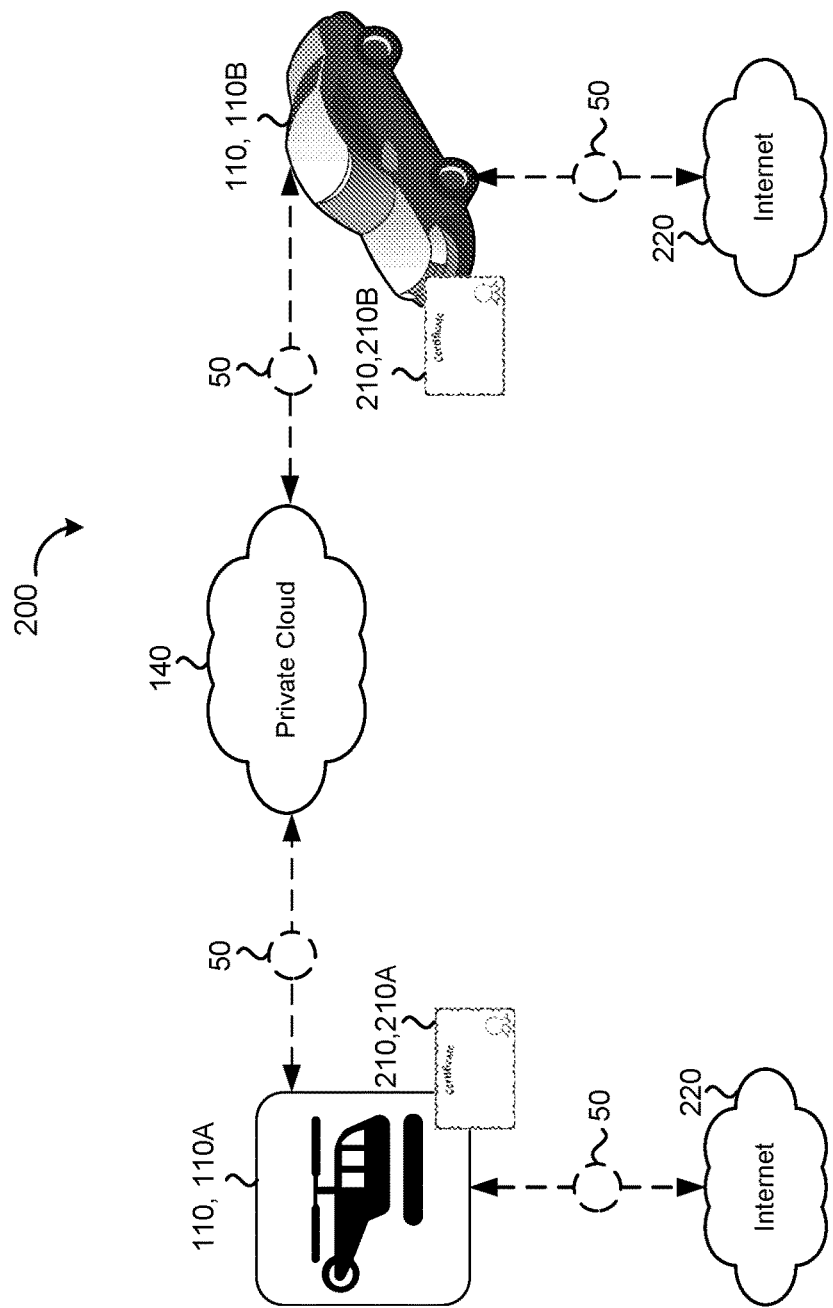
FIG. 2 is a schematic view of example devices connected to an example private cloud.

FIG. 2 is a schematic view 200 of example devices 110 connected to an example private cloud 140. As described above, a private cloud 140 may host a number of devices, including any number of edge devices 110. In an example of a private cloud environment of a military unit, the edge devices may include drones 110, 110A and military vehicles 110, 110B. These edge devices 110 may be configured to connect and disconnect from the private cloud 140 as necessary. For example, the drone 110A may be deployed to take pictures of a remote area. When the drone 110A is in the field it may be disconnected from the private cloud 140. Further, at times the drone 110A may be connected to the Internet 220. For example, if the drone 110A captures images that need to be shared urgently while not connected to the private cloud 140, the drone can initiate a data transfer via the Internet 220 (e.g., via a broadband cellular network or the like). The drone 110A may transfer data 50 using containers 150 via the transfer module 145 (FIG. 1). Further, a vehicle 110B, or any other suitable edge device 110 (e.g., a smart phone, a tablet, a laptop, a smart watch, on-board computer) may similarly be configured to repeatedly connect and disconnect from the private cloud 140 and/or the Internet 220 as necessary for operation.

In some implementations, each edge device 110 may include a CA certificate 210 issued by a certificate authority (CA). A CA certificate 210 is a digital certificate that certifies ownership of a public key by the named subject of the certificate, allowing other parties to trust (and/or be trusted by) the corresponding device (i.e., edge device 110). For example, the drone 110A corresponds to a first CA certificate 210, 210A and the vehicle 110B corresponds to a second CA certificate 210, 210B. Here, the certificates 210A, 210B, and any other respective certificate 210 corresponding to the other devices 110 of the private cloud 140, are different.

In conventional private cloud implementations, each device 110 of the private cloud generally uses the same CA certificate 210. As these implementations transfer data between devices 110 through cloning and/or binary data transfer, the single CA certificate 210 may be sufficient. In the current disclosure, having each device correspond to a unique CA certificate 210 allows for data 50 transfer through containers 150. Here, each time the transfer module 145 communicates to an edge device 110 (or data center 120), the transfer module 145 is able to establish a secure connection (to instantiate and/or deploy a container 150) using the unique CA certificate 210 of the corresponding device 110. In other words, the container 150 uses the unique CA certificates 210 to read and transfer data 50 to the devices 110 and 120.

Figure 3:
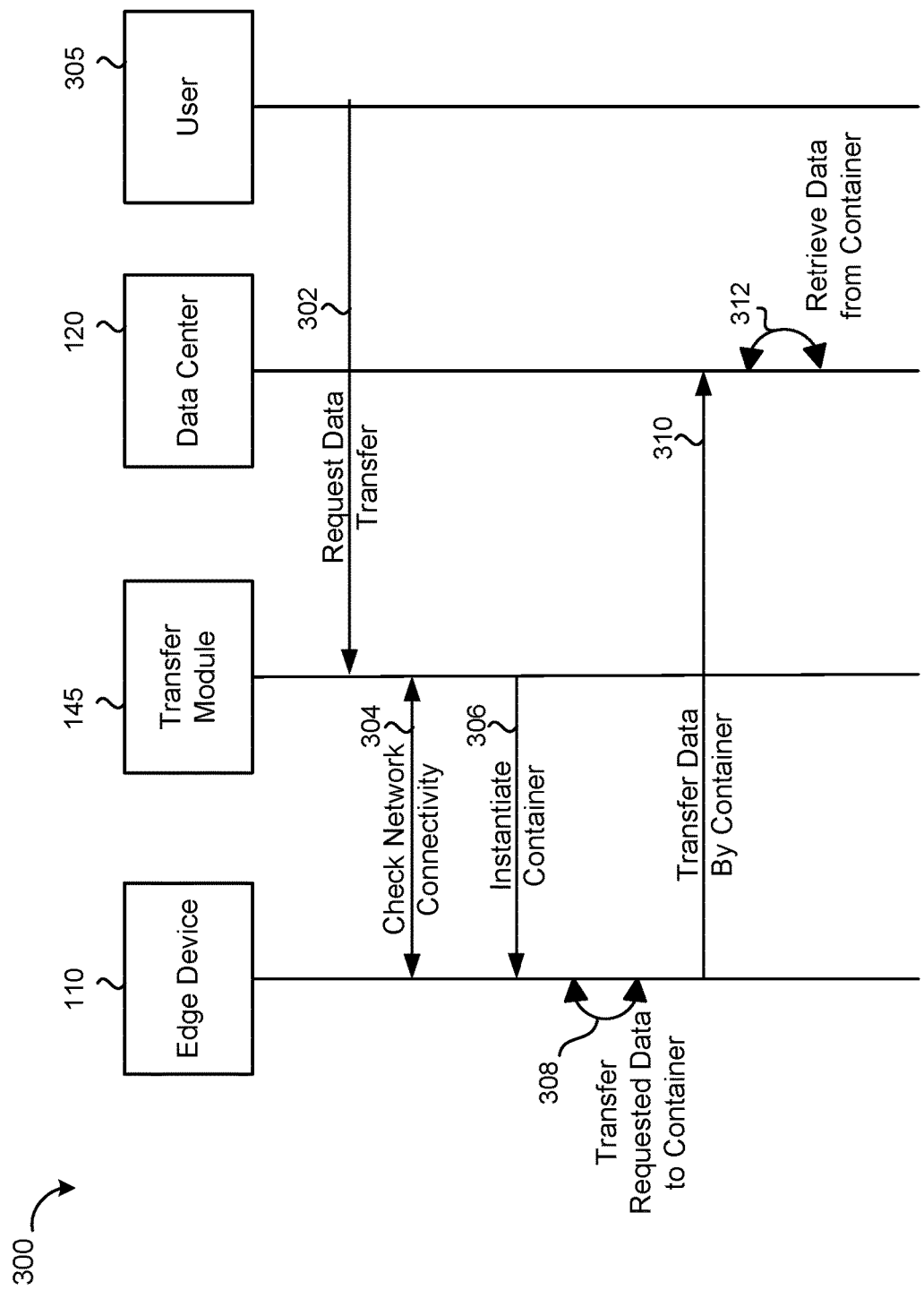
FIG. 3 is a schematic view of an example sequence diagram for on demand serverless container based storage transfer.

FIG. 3 is a schematic view of a sequence diagram 300 for on demand serverless container based storage transfer. At step 302, a user 305 requests a data transfer. For example, the user 305 sends a request 30 (FIG. 1) indicating that data 50 from a first device 110 is to be transferred to a second device 120. The request 30 may indicate that data 50 is to be transferred from any device of the private cloud 140 (i.e., an edge device 110 or data center 120) to any other device or devices 110, 120 of the private cloud 140. In the example sequence diagram 300, the request is for data 50 to be transferred from the edge device 110 to the data center 120. In some implementations, the transfer module 145 accepts or rejects the request based on a number of features. For example, the transfer module 145 determines that the user 305 associated with the request 30 has permissions for the request 30. In some implementations, the request 30 must satisfy certain conditions, such as a maximum memory, a maximum CPU usage, a maximum network limit, etc. The conditions may be set to a default/predetermined value or user defined.

At step 304, the transfer module 145 determines if the edge device 110 is connected to the private cloud 140. In some implementations, when the data 50 is to be transferred from the edge device 110 to a device outside of the private cloud 140 (e.g., to an external device through the Internet), the transfer module 145 may determine if the edge device is connected to the external device/network. If the edge device 110 is not connected to the private cloud 140 (or external network), the transfer module 145 may periodically recheck to see if the edge device 110 has reconnected.

At step 306, the transfer module 145 instantiates a container 150 at the edge device 110. In some implementations, the transfer module 145 schedules (i.e., for a point in time in the future) the transfer of data based on network resources, the size of the request, the status of the source device and/or the destination device, or any other appropriate basis. Accordingly, in these implementations, the transfer module 145 does not instantiate the container 150 at the edge device 110 until the scheduled time. At step 308, the edge device 110 transfers the requested data to the container 150. Here, the container 150 does not have access to local storage of the edge device 110. Instead, the edge device 110 is configured to upload the appropriate data 50 to the container 150. In some implementations, the transfer module 145 monitors the transfer of data 50. In case the container 150 crashes, or any other failure, the transfer module 145 is configured to allow automatic failure recovery, such as by instantiating a new container 150. The transfer module 145 may include a maximum number of attempts to complete the transfer of data 50 before rejecting the request 30. Further, the transfer module may monitor the progress of the data 50 upload, such as by running a describe on the upload or by tracking pod logs. If the edge device 110 disconnects from the private cloud 140 during the upload, the transfer module 145 can resume the upload once the edge device 110 reconnects to the private cloud 140 without having to restart the transfer of data 50 completely.

At step 310, the transfer module 145, via the container 150, transfers the data 50 to the data center 120. For example, the container 150 may establish a connection at the data center 120 using a CA certificate 210 unique to the data center 120 and then transfer the data accordingly. At step 312, the data center 120 retrieves the data 50 from the container 150.

Figure 4:
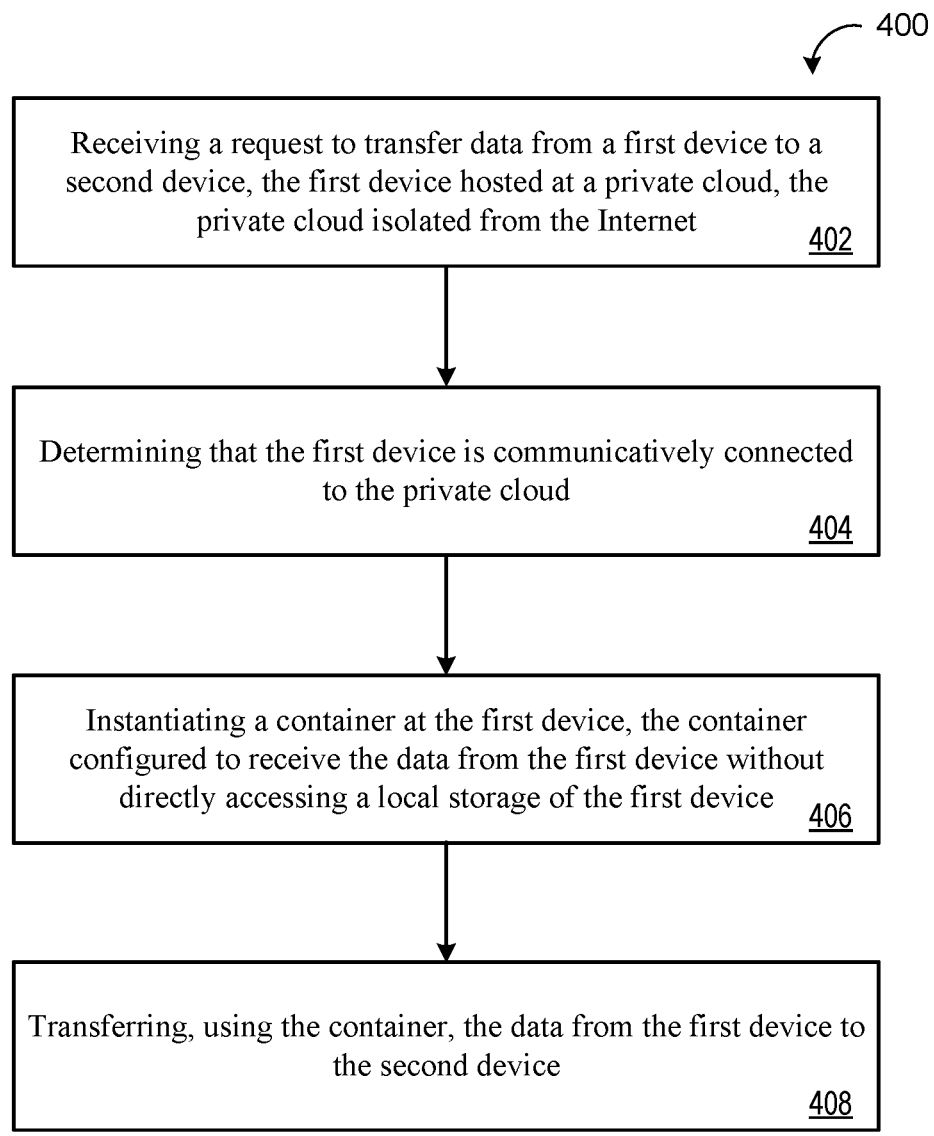
FIG. 4 a flowchart of an example arrangement of operations for a method of on demand serverless container based storage transfer.

FIG. 4 is a flowchart of an exemplary arrangement of operations for a method 400 of on demand serverless container based storage transfer. The method 400 can be performed by various interconnected computing devices such as the components of the system 100 of FIG. 1 and/or the computing device 500 of FIG. 5. At operation 402, the method 400 includes receiving a request 30 to transfer data 50 from a first device 110 to a second device 120, the first device 110 hosted at a private cloud 140, the private cloud 140 isolated from the Internet. At operation 404, the method 400 includes determining that the first device 110 is communicatively connected to the private cloud 140. In response to operation 404, at operation 406 the method 400 includes instantiating a container 150 at the first device 110, the container 150 configured to receive the data 50 from the first device 110 without directly accessing a local storage of the first device 110. At operation 408, the method 400 includes transferring, using the container 150, the data 50 from the first device 110 to the second device 120.

Figure 5:
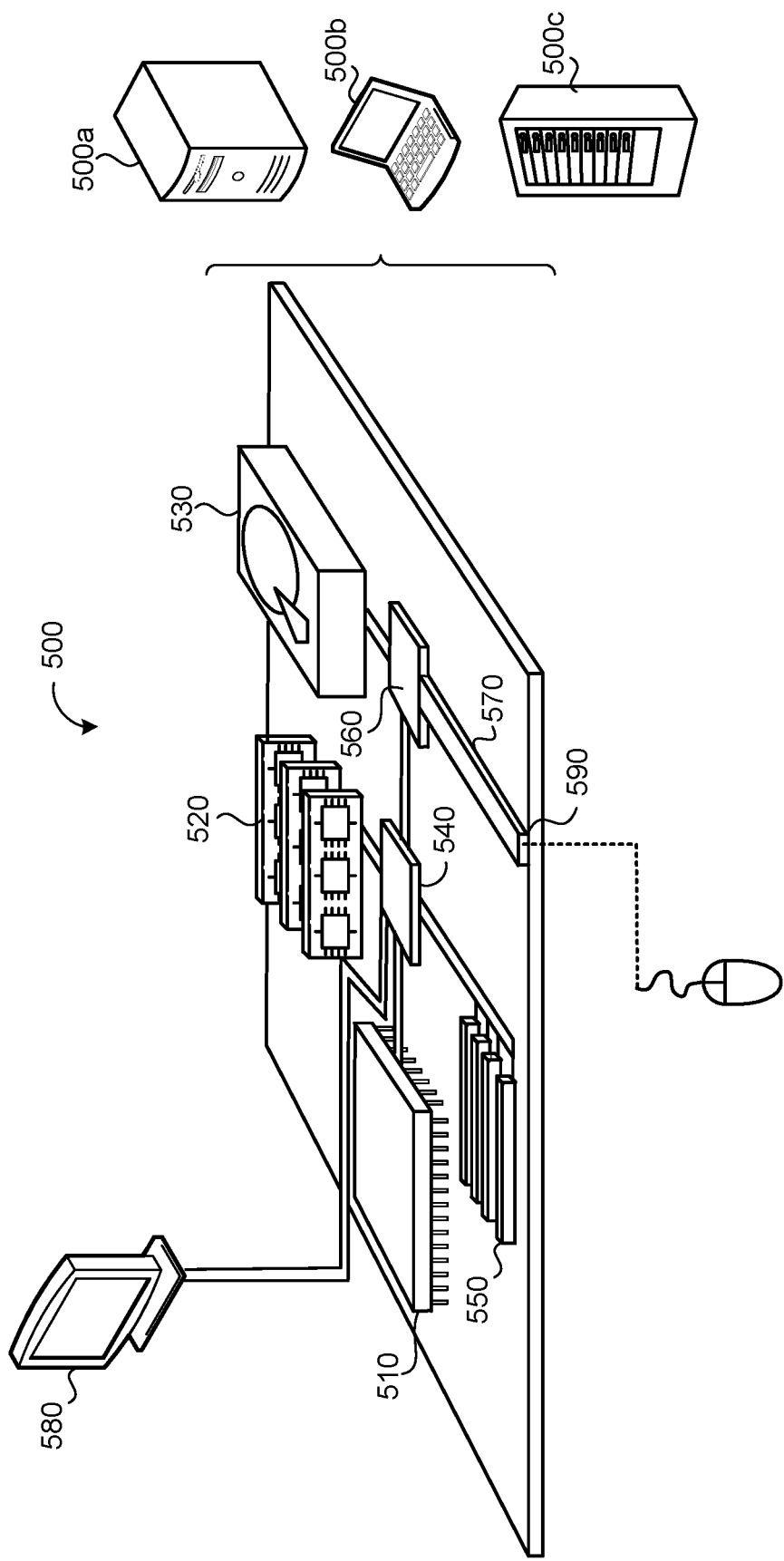
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
receiving a request to transfer data from a first device to a second device, the first device hosted at a private cloud, the private cloud isolated from the Internet, the first device comprising a portable device;
determining that the first device is communicatively connected to the private cloud;
in response to determining that the first device is communicatively connected to the private cloud, instantiating a container at the first device using a first certificate authority (CA) certificate, wherein the container is configured to receive the data from the first device without the container or the data processing hardware directly accessing a local storage of the first device, and wherein the container is further configured to transfer the data from the first device to the second device using a second CA certificate.

2. The method of claim 1, wherein the second device is hosted at the private cloud.

3. The method of claim 2, wherein the second device comprises a data center.

4. The method of claim 3, wherein the first device comprises an edge device of the private cloud, wherein the edge device comprises one or more of:
a drone;
a smart phone;
a laptop; or
an on-board computer of a vehicle.

5. The method of claim 1, wherein the second device is not hosted at the private cloud.

6. The method of claim 5, wherein:
the operations further comprise determining that the first device is communicatively coupled to the second device via a network; and
instantiating the container at the first device is in response to determining that the first device is communicatively coupled to the second device via the network.

7. The method of claim 6, wherein the network comprises an Internet connection.

8. The method of claim 1, wherein the operations further comprise, prior to determining that the first device is communicatively connected to the private cloud, determining that the first device is not communicatively connected to the private cloud, wherein determining that the first device is communicatively connected to the private cloud comprises determining that the first device has become communicatively connected to the private cloud after determining that the first device is not communicatively connected to the private cloud.

9. A system comprising:
data processing hardware; and
memory hardware in communication with the data processing hardware, the memory hardware storing instructions that when executed on the data processing hardware cause the data processing hardware to perform operations comprising:
receiving a request to transfer data from a first device to a second device, the first device hosted at a private cloud, the private cloud isolated from the Internet, the first device comprising a portable device;
determining that the first device is communicatively connected to the private cloud;
in response to determining that the first device is communicatively connected to the private cloud, instantiating a container at the first device using a first certificate authority (CA) certificate, wherein the container is configured to receive the data from the first device without the container or the data processing hardware directly accessing a local storage of the first device, and wherein the container is further configured to transfer the data from the first device to the second device using a second CA certificate.

10. The system of claim 9, wherein the second device is hosted at the private cloud.

11. The system of claim 10, wherein the second device comprises a data center.

12. The system of claim 11, wherein the first device comprises an edge device of the private cloud, wherein the edge device comprises one or more of:
a drone;
a smart phone;
a laptop; or
an on-board computer of a vehicle.

13. The system of claim 9, wherein the second device is not hosted at the private cloud.

14. The system of claim 13, wherein:
the operations further comprise determining that the first device is communicatively coupled to the second device via a network; and
instantiating the container at the first device is in response to determining that the first device is communicatively coupled to the second device via the network.

15. The system of claim 14, wherein the network comprises an Internet connection.

16. The system of claim 9, wherein the operations further comprise, prior to determining that the first device is communicatively connected to the private cloud, determining that the first device is not communicatively connected to the private cloud, wherein determining that the first device is communicatively connected to the private cloud comprises determining that the first device has become communicatively connected to the private cloud after determining that the first device is not communicatively connected to the private cloud.

* * * * *